May 13, 1930.  J. COURATIN  1,758,736
SPRING SUSPENSION FOR CYCLE AND MOTOR CYCLE SADDLES
Filed April 21, 1928
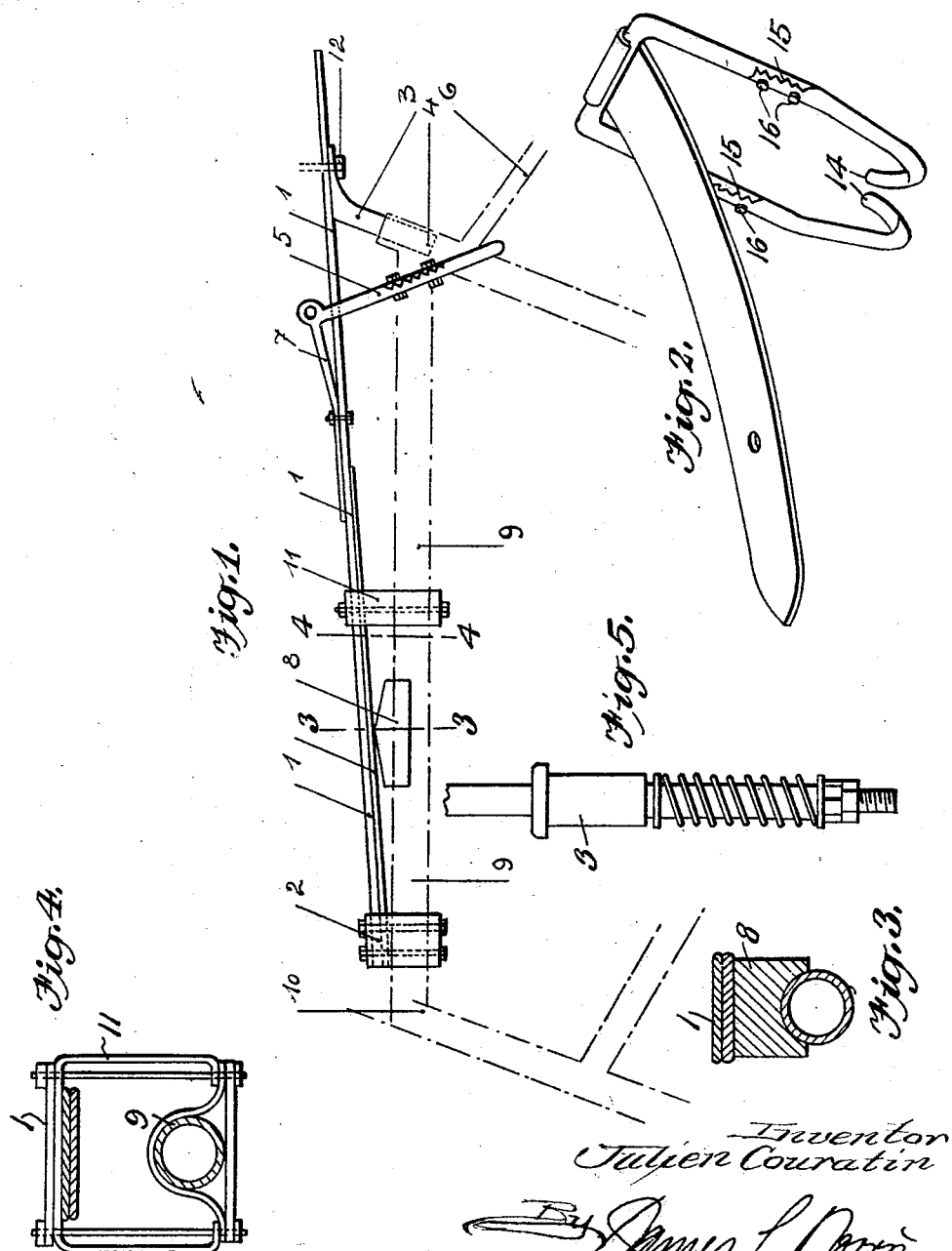
Inventor
Julien Couratin
By James L. Norris
Attorney Patented May 13, 1930

1,758,736

UNITED STATES PATENT OFFICE

JULIEN COURATIN, OF PAR CLION, FRANCE

SPRING SUSPENSION FOR CYCLE AND MOTOR CYCLE SADDLES

Application filed April 21, 1928, Serial No. 271,926, and in France April 22, 1927.

This invention relates to spring suspensions for the saddles of motor bicycles and pedal cycles.

The principal object of the invention is to provide an improved spring suspension which will give the rider perfect protection from road shocks.

An important special object of the invention is to provide a spring suspension which is supported not at the rear part of the frame, where the vibration is greatest, but near the front of the frame where there is less movement due to road shocks.

Another object of the invention is to provide a spring suspension which is capable of adjustment to suit the weight of the rider.

With these and other objects in view the invention consists in the construction and arrangement of parts hereinafter described and pointed out in the appended claims.

In the accompanying drawings, Fig. 1 is a side elevation of a spring suspension constructed and arranged according to one form of the invention, a part of the frame of the motor or pedal cycle on which the suspension is mounted being indicated by dot and dash lines.

Fig. 2 is a perspective view of the member for limiting the upward movement of the free end of the spring.

Fig. 3 is a section on line 3—3 of Fig. 1.

Fig. 4 is a detail of the safety clip with the supporting tube and spring in section.

Fig. 5 is a detail view of the safety piston support.

As shown in the drawings the spring suspension comprises a laminated spring 1 in the form of a cantilever fixed at its front end to the top tube 9 of the cycle frame adjacent the steering head tube 10 by means of a clamp 2, and bearing at a point intermediate its ends on a wood block or like element 8 which is slidably secured on the top tube 9 and to abut or engage the spring 1 in such a manner that said block can be slid longitudinally on the top tube 9 to regulate the tension of the spring.

Near its rearward end the spring 1 is provided with a bolt 12 for securing the saddle, such bolt serving also for securing a safety element or piston 3 which engages loosely in the saddle tube 4 and can slide up and down therein.

The upward movement of the free end of the spring 1 is limited by an adjustable U-shaped connecting element 5 which is swingingly attached to the free end of a short plate spring 7 bolted or otherwise fixed, as at 13, to the spring 1 and the two free ends of the element 5 are adapted to be hooked below the junction of the saddle tube 4 and rear braces 6 of the cycle frame. Further in order to limit the upward movement of the spring 1 in the event of breakage, a safety clip 11 is fixed to the top tube 9 and loosely embraces the spring at a point intermediate its length.

The terminal member of the element 5 can be lengthened or shortened by means of the toothed portion 15 and balls 16.

The normal operation of the spring 1 as a cantilever to support the weight of the saddle in a yielding manner will now be obvious. When it is desired to adjust the spring to the weight of the rider, the block 8 is adjusted by sliding it along the top tube until the best position for contact with the spring is found. The connecting element 5 may be temporarily released by disengaging the hooked ends 14 from the cycle frame to free the spring 1 from tension in order to facilitate the adjustment of the block 8.

Should the spring break at a point between the safety clip 11 and the bolt 12, the broken end will be prevented from springing up and injuring the driver owing to the fact that it will be held and stopped by the safety clip 11. Further the safety piece 3 will support the saddle and prevent the rider from being thrown.

I claim:—

1. A suspension for cycle saddles including a spring, means for securing the forward end at a point on the cycle frame near the steering tube, a slidable guiding member attached adjacent the rear free end and for slidably fitting in the saddle tube of the cycle frame, an adjustable fulcrum for the spring, and a limiting means connected to the spring between the fulcrum and the guiding member.

2. A suspension for cycle saddles according to claim 1 in which the adjustable fulcrum is a block slidably attached to the cycle frame for movement to and from the secured end of the spring.

3. A suspension for cycle saddles according to claim 1 in which a fixed limiting means is attached to the cycle frame and loosely embraces the spring at a point between the adjustable fulcrum and its rear end.

In witness whereof I affix my signature.

JULIEN COURATIN.